May 15, 1956     F. A. LINDGREN     2,745,654
SELF-PROPELLED ROOM AND PILLAR KERF CUTTING MACHINE
Filed July 24, 1952     4 Sheets-Sheet 1
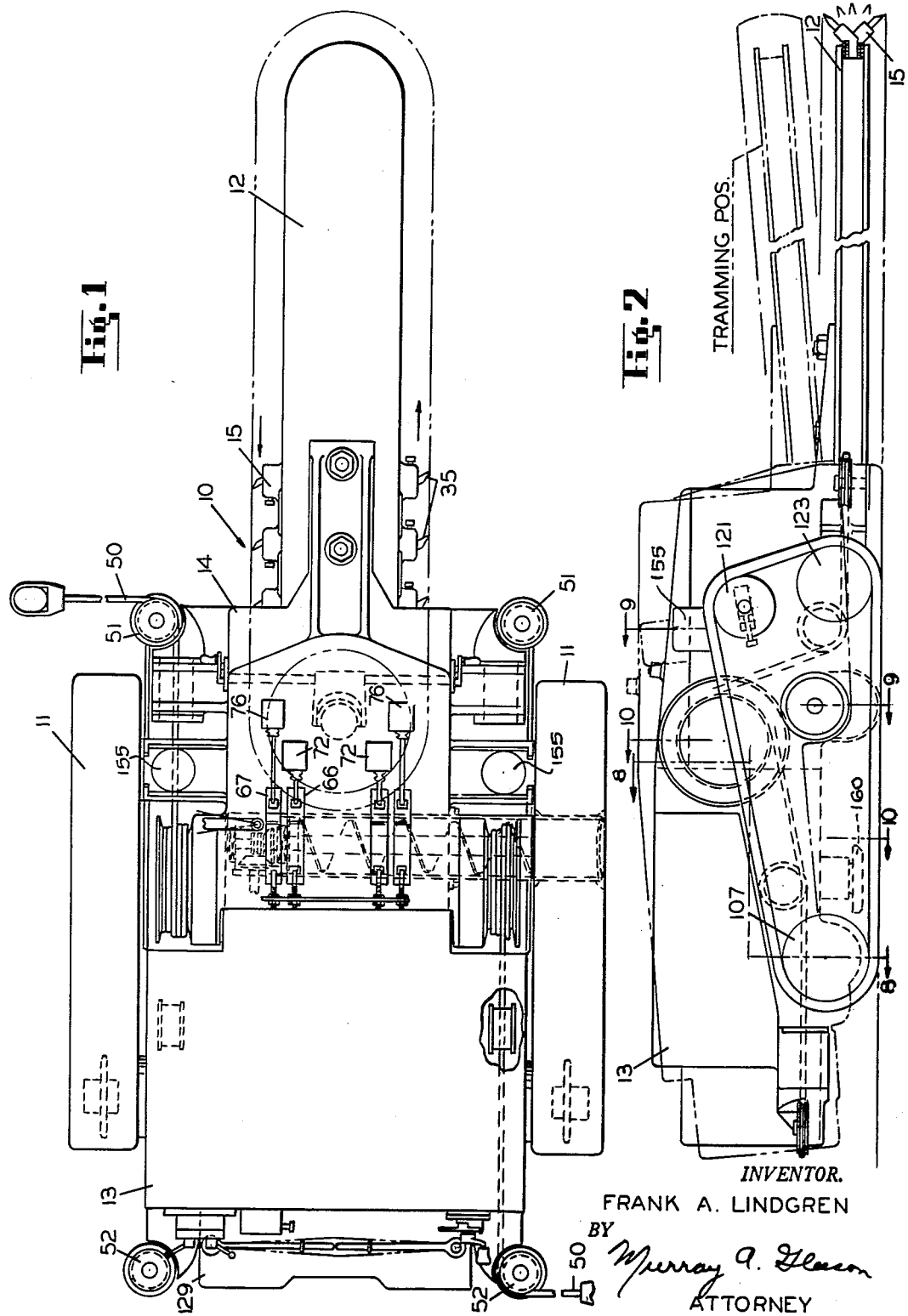
INVENTOR.
FRANK A. LINDGREN
BY Murray A. Gleason
ATTORNEY

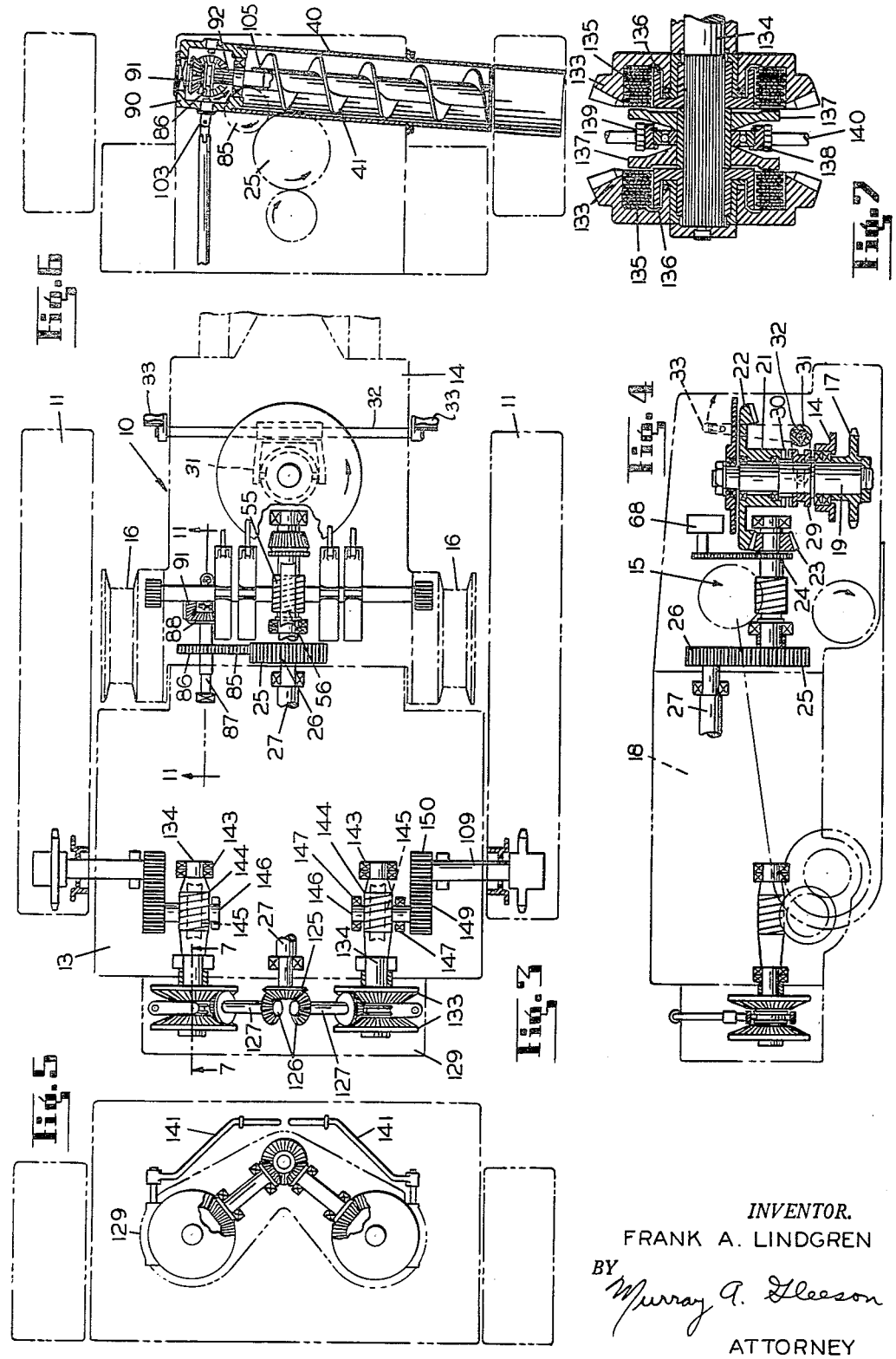

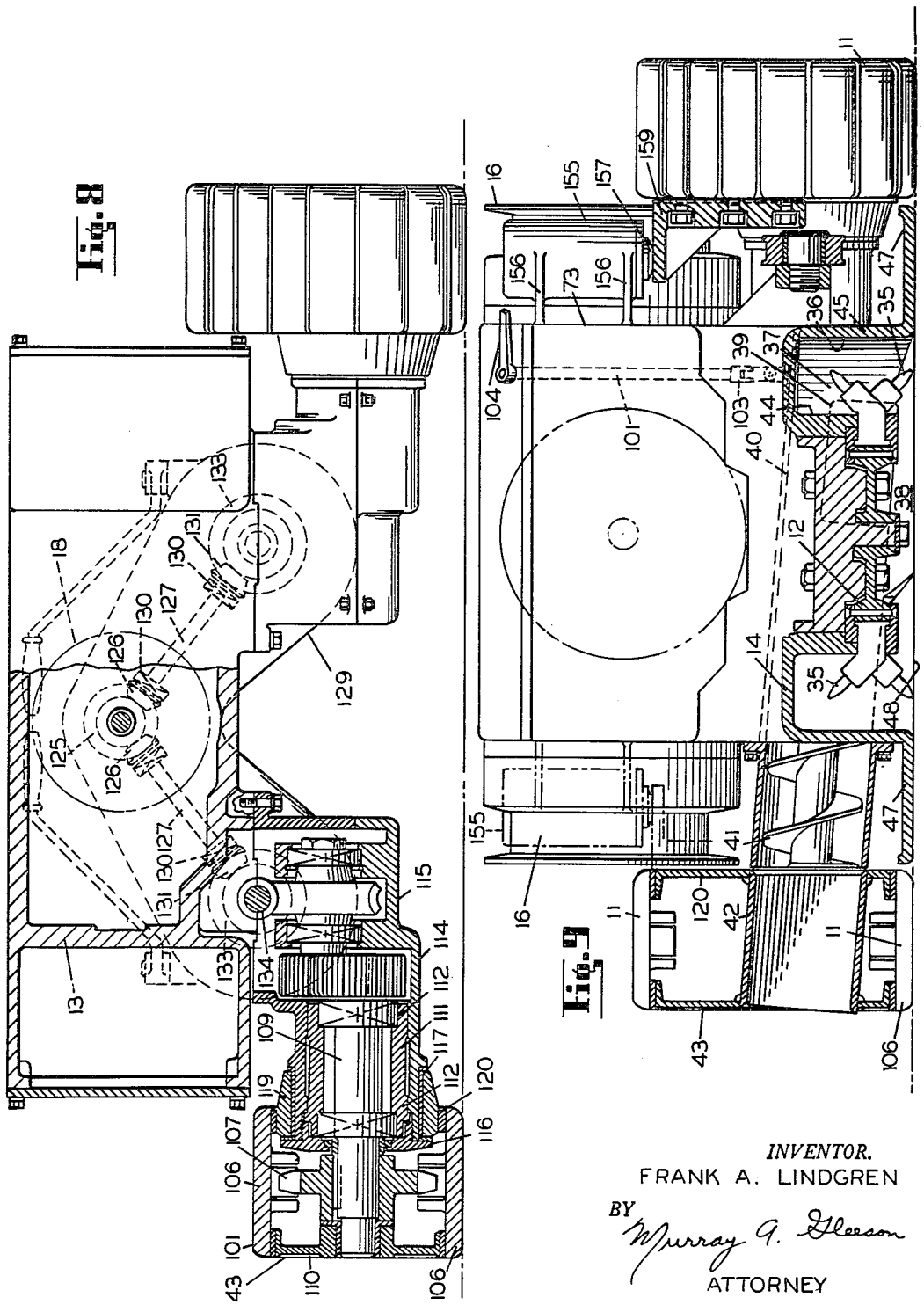

May 15, 1956 F. A. LINDGREN 2,745,654
SELF-PROPELLED ROOM AND PILLAR KERF CUTTING MACHINE
Filed July 24, 1952 4 Sheets-Sheet 4
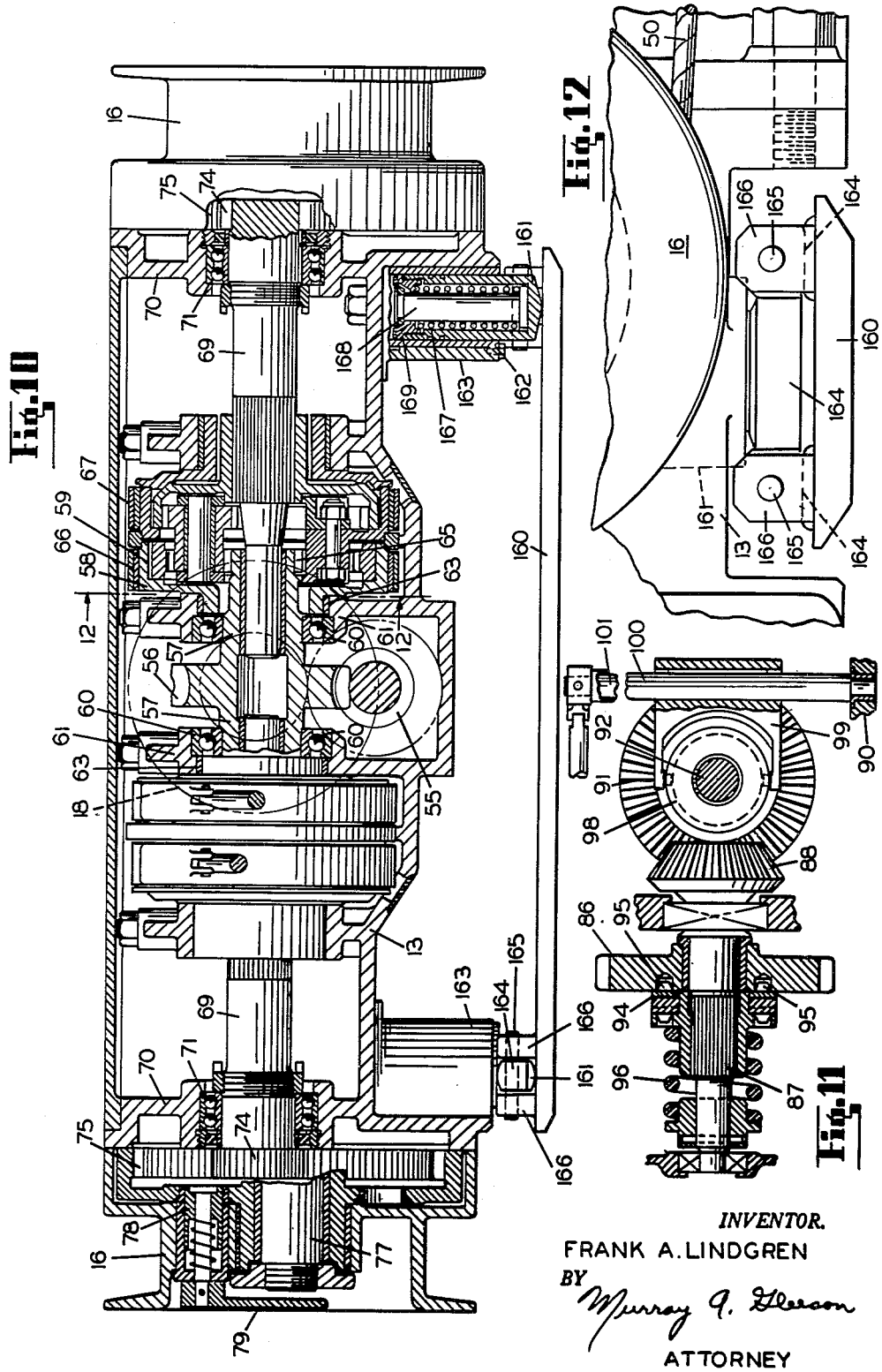
INVENTOR.
FRANK A. LINDGREN
BY
Murray G. Gleeson
ATTORNEY

United States Patent Office 2,745,654
Patented May 15, 1956

2,745,654

SELF-PROPELLED ROOM AND PILLAR KERF CUTTING MACHINE

Frank A. Lindgren, Chicago, Ill., assignor to Goodman Manufacturing Company, Chicago, Ill., a corporation of Illinois Application July 24, 1952, Serial No. 300,621

9 Claims. (Cl. 262—30)

This invention relates to improvements in kerf cutting machines and more particularly relates to a novel and improved form of self-propelled room and pillar type of kerf cutting machine particularly adapted for cutting in thin seams of coal.

A principal object of my invention is to provide a new and improved form of kerf cutting machine, cutting by slidable movement along the mine bottom and having transporting means forming a part thereof and so arranged as not to interfere with the cutting operation.

Another object of my invention is to provide a novel and improved form of kerf cutting machine of the room and pillar type having continuous traction tread devices forming a part thereof for propelling the machine from place to place and arranged to slide laterally along the mine bottom during cutting.

Another object of my invention is to provide a new and efficient construction of room and pillar type of kerf cutting machine in which the machine is transversely pivotally supported on laterally spaced continuous tread devices for tilting movement about the drive sprocket for the tread devices, for elevating the machine frame and cutter bar to clear the ground when transporting the machine from working place to working place.

A further and more detailed object of my invention is to provide a kerf cutting machine of an improved construction and arrangement, wherein the machine frame at the front of the machine has a ground engaging surface supporting the front of the machine during cutting and wherein the rear of the machine is supported on continuous tread devices, the bottom surfaces of which are on the same level as the ground engaging surface of the machine frame when in position for cutting.

A further object of my invention is to provide a new and improved form of kerf cutting machine pivotally supported adjacent its rear end on laterally spaced continuous tread devices and elevated adjacent its forward end by cylinder and piston devices arranged in a simplified manner, so as to avoid the need of pivotal supports therefor.

Still another object of my invention is to provide a kerf cutting machine of the room and pillar type, pivotally supported on laterally spaced continuous tread devices for movement about the axis of rotation of the drive sprockets therefor and having ground engaging surfaces on a level with the bottom of the machine frame when the machine is positioned for cutting, and also having extensible members on the machine frame having slidable abutting engagement with the tread device frame, for pivoting the forward end of the machine about the drive sprockets of the tread devices and positioning the machine out of engagement with the ground for transportation.

Another object of my invention is to provide a simple and improved form of kerf cutting machine of the room and pillar type mounted on laterally spaced continuous tread devices and having a novel and simplified form of cuttings clearing conveyor, arranged to discharge the cuttings through the tread device on the retreating side of the machine.

A still further and more detailed object of my invention is to provide a kerf cutting machine of the room and pillar type wherein the cuttings are collected at the forward end portion of the machine frame and wherein the machine has continuous tread devices forming a part thereof for transporting the machine from working place to working place and wherein a spiral conveyor is mounted on the machine frame in cuttings receiving relation with respect to the cutter chain and extends transversely thereof to discharge the cuttings through the tread device frame on the retreating side of the machine when the machine is in a cutting position.

These and other objects of my invention will appear from time to time as the following specification proceeds and with reference to the accompanying drawings wherein:

Figure 1 is a top plan view of a kerf cutting machine constructed in accordance with my invention;

Figure 2 is a view in side elevation of the machine shown in Figure 1;

Figure 3 is a partial diagrammatic plan view showing the machine frame and motor by broken lines and illustrating the drive mechanism for the operative parts of the machine in solid;

Figure 4 is a partial diagrammatic view of the machine in side elevation, showing the outline of the machine by broken lines and illustrating the drive to the cutter chain drive sprocket and one traction device in substantially longitudinal section;

Figure 5 is a partial diagrammatic rear end view of the machine showing the outline of the machine by broken lines in order to illustrate certain details of the drive to the continuous tread devices;

Figure 6 is a partial diagrammatic view of the machine taken through the slack remover and showing the outline of the machine by broken lines and the slack remover in transverse section;

Figure 7 is an enlarged fragmentary cross-sectional view taken through one set of reversing bevel gears and clutches for driving an associated continuous tread device;

Figure 8 is an enlarged fragmentary sectional view of the machine taken substantially along line 8—8 of Figure 2, showing the support for the machine on one of the continuous tread devices in transverse section;

Figure 9 is a fragmentary transverse sectional view taken substantially along line 9—9 of Figure 2 and showing the cuttings channel in the machine, and the discharge passageway for the cuttings through one continuous tread device;

Figure 10 is a transverse sectional view taken substantially along line 10—10 of Figure 2 and showing the drive to the feed drums and the tilting shoe at the rear end of the machine;

Figure 11 is a sectional view taken substantially along line 11—11 of Figure 3 and showing certain details of the drive to the cuttings clearing or slack conveyor; and Figure 12 is a fragmentary side view of the machine, showing certain other details of the tilting shoe not shown in Figure 10.

In the embodiment of my invention illustrated in the drawings, I have shown a mining machine 10 of the room and pillar type, mounted on laterally spaced continuous traction tread devices 11—11, which may transport the machine from working place to working place and may also afford a means for sumping a forwardly projecting cutter bar 12 into the coal face, to initiate the under-cutting operation.

The mining machine 10 includes a main frame made up of a casing 13 for a motor 18 and a ground engaging support frame and housing 14 secured to the forward end of the casing 13 and extending forwardly therefrom. The housing 14 forms a slidable support for the forward end of the machine along the ground and also forms a support for the forwardly projecting cutter bar 12. The frame 14 forms a housing for the gearing for driving a cutter chain 15 about the cutter bar 12 and for independently driving feed drums 16—16 journalled at each side of said frame 14.

The cutter bar 12 may be of a well known form having a channelled guide extending therealong and around the forward end thereof, to slidably receive and guide the cutter chain 15 in an orbital path thereabout. The cutter chain 15 is shown as meshing with a sprocket 17 on the lower end of a vertical shaft 19 (see Figure 4). The shaft 19 is shown as being suitably journalled in the support frame 14 and as extending through a hub 21 of a bevel gear 22. The hub 21 is journalled on the vertical shaft 19 on suitable anti-friction bearings and is selectively connected thereto to drive the same by means of a clutch member 29, as will hereinafter more clearly appear as this specification proceeds.

The bevel gear 22 is driven from a bevel pinion 23 on a longitudinally extending intermediate shaft 24, journalled in the frame 14 on suitable anti-friction bearings. A spur gear 25 on the rear end of the intermediate shaft 24, meshes with and is driven from a motor pinion 26 on the forward end of a shaft 27 for the motor 18.

The clutch member 29 is keyed on the vertical shaft 19 beneath the hub 21 of the bevel gear 22 and may be a jaw clutch member engageable with depending jaws 30 on the lower end of said hub, to rotatably drive the shaft 19 and cutter chain sprocket 17. The clutch member 29 is operated by a clutch fork 31 on a rock shaft 32. Hand levers 33, 33 on opposite ends of said rock shaft are provided to operate the clutch from either side of the machine.

The cutter chain 15 is herein shown as having a plurality of cutter bits 35, 35 projecting therefrom in various angular relations with respect thereto as usual, to cut clearance for the cutter bar, the lower of which bits are herein shown as being disposed adjacent the mine bottom so as to cut directly along the mine bottom. It is, of course, obvious that various spacing of the cutter bar with respect to the mine bottom may be had. The cutter chain 15 is shown as propelling the cuttings into and along a cuttings channel 36 formed in an open central portion of the frame 14. The channel 36 is defined by an inner wall 44 extending along the cutter bar 12 and an outer wall 45 extending in parallel relation with respect thereto. The outer wall 45 terminates into a curved rear wall 37 of the frame 14, which conforms to the path of travel of the cutter bits as they turn about the sprocket 17. The channel 36 leads to an inclined bottom wall 38 of the frame 14. The inclined bottom wall 38 leads to a cuttings receiving opening 39 in a cuttings collecting tube 40 for a cuttings conveyor, and cooperates with the cutter chain 15 to guide the cuttings to be expelled from the machine through said tube. The tube 40 is shown as extending transversely of the frame 14 at an angle upwardly inclined toward the retracting side of the machine to raise the lower end of said tube over the lower run of the tread device 11 on the retreating side of the machine. A spiral conveyor 41 is shown as extending along said tube for propelling the cuttings along said tube out of the way of the cutter chain and for expelling the cuttings from the retreating side of the machine. As herein shown, a tube 42 extends through a tread frame 43 for the continuous traction tread device on the retreating side of the machine and is secured to said frame. The tube 42 is shown in Figure 9 as registering with the discharge end of the spiral conveyor 41, when the frame 14 is in a cutting position in engagement with the ground.

The frame 14 is also shown as having laterally extending shoes 47, 47 extending laterally from the side walls 45, 45 to positions adjacent the insides of the continuous tread devices 11, 11. The shoes 47, 47 extend along each side of the cutter bar 12 and converge into a rearwardly extending bottom portion 48 of the frame 14 and form a ground bearing support, for supporting the forward end of the machine for slidable movement along the ground.

The mechanism for feeding the machine includes generally the two independently operable power driven feed drums 16, 16, having flexible draft devices 50, 50 trained thereupon and adapted to be wound thereon. The flexible draft devices 50, 50 may be trained from either the forward end of the machine about sheaves 51 or from the rear end of the machine about sheaves 52, to fixed abutments remote from the machine in the usual manner, for sumping the cutter bar 12 and cutter chain 15 into the coal face and feeding said cutter bar and chain laterally along the coal face and for controlling movement of the machine during the sumping and feeding operations.

The drums 16, 16 are driven from the motor 18 at either a high or low frictionally controlled speed through a worm 55 on the intermediate shaft 24, which meshes with a worm gear 56. The worm gear 56 is herein shown as being formed integrally with a sleeve 57 extending laterally in opposite directions from said worm gear within casings 58, 58 of planetary gear reduction devices 59, 59 each of which serves to independently drive a feeding drum 16. The sleeve 57 is shown as being journalled on anti-friction bearings 60, 60 mounted in bearing supports 61, 61 extending upwardly from the frame 14 along the inner sides of the casings 58, 58. The bearing supports 61, 61 also form bearing supports for the casings 58, 58 on bearings 63, 63. A sun pinion 65 is shown as being formed integrally with each inner end of the sleeve 57 and as forming the drive means for the planetary gear reduction devices 59, 59 in a manner similar to that shown and described in my prior Patent No. 2,006,399, which issued July 21, 1935. The planetaries 59, 59 therefore need not be described in detail herein, except to point out that each planetary is controlled by high and low speed friction bands 66 and 67 respectively, to afford high and low frictionally controlled speed drives for each feeding drum, and that said planetaries are mounted on and independently drive the winding drums 16, 16 through separate aligned shafts 69, 69 which have their adjacent ends journalled within the sleeve 57, and which are journalled at their outer ends in side walls 70, 70 of the frame 14 on anti-friction bearings 71, 71.

The friction bands 66 and 67 are diagrammatically shown in Figure 1 as being applied and released under the control of fluid operated servo-motors 72 and 76, respectively. Fluid is supplied to the servo-motors 72 and 76 by a pump 68 diagrammatically illustrated in Figure 4 and shown as being driven from the shaft 24 through a spur gear drive 75. Suitable valve means (not shown) may control the supply and release of fluid under pressure to and from the servo-motors 72 and 73 in a manner well known to those skilled in the art, so not herein shown or described.

The shafts 69, 69 have pinions 74, 74 on their outer ends, which are disposed on the outsides of the walls 70, 70 of the frame 14. The pinions 74, 74 mesh with and drive internal gears 75, 75 rotatably journalled on their hubs on stub shafts 77, 77 secured to and extending outwardly from the side walls 70, 70. The feed drums 16, 16 are shown as being journalled on the hubs of the respective internal gears 75, 75 and as being selectively connected to its respective internal gear, to be driven therefrom by a spring urged pin clutch 78 operated by a hand lever 79. The clutches 78, 78 may be of a form commonly used to drive the feed drums of kerf cutting machines, so need not herein be described further.

The drive from the forward end of the motor to the screw or spiral conveyor 41 is shown in Figures 5, 6, and 11 as including a spur gear 85 meshing with and driven from the spur gear 25 on the intermediate shaft 24. The spur gear 85 meshes with and drives a spur gear 86 journalled on a longitudinally extending shaft 87. The shaft 87 is suitably journalled in the frame 14 adjacent its ends. The forward end of the shaft 87 extends within a gear casing 90 and has a bevel pinion 88 keyed thereon. The casing 90 forms a continuation of the inner end of the conveyor tube 40 and forms a housing for the gearing for driving the spiral conveyor 41. The bevel pinion 88 meshes with and drives a bevel gear 91 freely mounted on a coupling shaft 92 suitably journalled at its ends in the end walls of the housing 90.

The spur gear 86 drives the shaft 87 through an overload release clutch 94, herein shown as being a well known form of pin type of clutch having pins 95, 95 facing the spur gear 86 and urged into engagement with corresponding recesses therein by means of a compression spring 96. The angles of the engaging surfaces of the pins 95, 95 are such as to release the gear 86 from driving engagement with the shaft 87 upon predetermined overload conditions, as when a cutter chain bit may become wedged in the conveyor spiral.

A clutch collar 98 splined or feathered on the coupling shaft 92 is provided to selectively connect the bevel gear 91 to said shaft, to drive the same. The clutch collar 98 may have clutch jaws (not shown) on the face thereof facing the bevel gear 91 for engagement with corresponding clutch jaws (not shown) on the face of said bevel gear. The clutch collar 98 is moved into driving engagement with the bevel gear 91 by means of a clutch fork 99 having slidable engagement with said clutch collar and secured to a vertically extending rock shaft 100, journalled in the gear housing 90 and projecting upwardly therefrom. The rock shaft 100 is operated by a vertical shaft 101 connected with said rock shaft by a universal coupling 103 (see Figures 6 and 9). The shaft 101 is suitably journalled in the frame 14 and is operated by means of a hand lever 104 at the upper end thereof as shown in Figure 9. The coupling shaft 92 extends within a tube 105 of the spiral conveyor 41 and is suitably secured thereto, to drive the same.

The continuous traction tread devices 11, 11 may be of any well known form and are shown in Figure 8 as comprising a plurality of interconnected traction shoes 106, 106 meshing with and driven from a sprocket 107 on a transverse shaft 109. The shaft 109 is shown as being journalled at its outer end in a side frame member 110 of the tread frame 43. Said shaft 109 extends inwardly along a sleeve 111 and is journalled therein on spaced anti-friction bearings 112, 112. The sleeve 111 is shown as being secured to and extending inwardly within an outwardly projecting annular housing portion 114 of a gear housing 115 for the drive gearing for the shaft 109 and sprocket 107. The gear housing 115 is shown as extending from a position rearwardly of the motor housing 13, and forwardly along and beneath said motor housing and secured thereto, to form a support therefor. The sleeve 111 is shown as being secured within the annular housing portion 114 by an end plate 116, threaded within said annular housing portion and engaging a shouldered end portion of said sleeve. The sleeve 111 may be pressed within the annular housing portion 114 with a light press fit or may be keyed within said annular housing portion, to prevent rotation of said sleeve with respect to said housing portion. The annular housing portion 114 is shown as being encircled by a relatively long bearing 117 on which is journalled a boss 119. The boss 119 is herein shown as being formed integrally with and extending inwardly from an inner side frame member 120 of the tread frame 43 and forming a wide bearing support for the housing 114 on said tread frame and supporting the rear end of the machine on said tread frame for tilting movement about the axis of the drive sprocket 107.

Each continuous traction tread 11 may be slidably guided along the side frame members 110 and 120 of the associated tread frame 43 in any well known manner. Each traction tread is herein shown as extending forwardly from the upper margins of the sprocket 107 in an upwardly inclined direction to and around a tension idler 121 disposed adjacent the forward end of the machine (see Figure 2). From thence the tread extends downwardly and changes its direction of travel around an idler 123 and extends rearwardly therefrom along the bottom of the tread frame to and around the drive sprocket 107. If desired suitable rollers (not shown) may engage the lower runs of the traction treads to form a support therefor, or a yieldable support may be provided for the lower runs of the tread devices to accommodate the tread devices to conform to an uneven mine bottom. Said supporting means is not herein shown or described since it forms no part of my invention.

The ground engaging surfaces of the traction treads 106 of each continuous tread device 11 are shown as being on the same level as the ground engaging surfaces of the shoes 47, 47 and the bottom of the rear end portion of the frame 14 when the machine is in a cutting position in engagement with the ground. The treads 106, 106 are shown as being curved upwardly along their opposite sides so they may slide laterally along the ground during lateral feeding movement of the machine along the mine bottom by operation of the feed drums 16 and flexible draft devices 50 wound thereon, and form a support for the rear end portion of the machine during the cutting operation as the machine is moved laterally along the mine bottom by operation of and under control of the flexible draft devices 50.

The drive to the continuous traction tread devices 11, 11 is from the rear end of the shaft 27 of the motor 18. A bevel gear 125 on the rear end of the motor shaft 27 meshes with and drives bevel pinions 126, 126 secured to the upper ends of the shafts 127, 127 arranged in a vertical plane along the rear ends of the motor casing 13. The shafts 127, 127 are shown in Figures 3 and 8 as extending angularly outwardly and downwardly from the bevel gear 125 along the rear end portion of the motor casing 13 and as being journalled at the rear end of the motor casing on anti-friction bearings 130, 130. The gearing at the rear of the motor casing 13 is shown as being housed within a housing 129, which extends downwardly beneath the bottom of the motor casing 13 and inwardly therealong and conforms generally to the inclination of the shafts 127, 127. The portions of the housing 129 extending inwardly along the bottom of the motor casing are shown as forming the top halves of the gear housings 115, 115. Bevel pinions 131, 131 on the lower ends of the shafts 127, 127 are shown as meshing with facing bevel gears 133, 133. Each set of facing bevel gears 133, 133 is selectively operable to reversely drive a longitudinal shaft 134 without reversal of the motor 18 through suitable clutch mechanism, herein shown as being a plurality of engaging friction disks 135, 135.

Alternate of the friction disks 135, 135 for each bevel gear 133, are keyed or splined to the inner periphery of the bevel gear 133, and the outer periphery of a clutch member 136 keyed on the longitudinal shaft 134. The friction disks 135 are engaged with each other by engaging members 137 slidable along the clutch member 136 between the sets of friction disks 135, 135 and are slidably moved along said clutch member by a collar 138 and clutch fork 139 on a rock shaft 140. The rock shaft 140 is journaled in the casing 129 and is operated by a hand lever 141 at the rear of the machine. Operation of either of hand levers 141 may effect driving of the respective longitudinal shaft 134 in forward or reverse directions.

The longitudinal shafts 134, 134 extend beneath the casing for the motor 13 and are journaled in the housing 115 on anti-friction bearings 143, 143. A worm 144 is shown as being formed integrally with the shaft 134 and as meshing with and driving a worm gear 145 on a tranverse shaft 146. The transverse shaft 146 is journaled in the housing 115 on opposite sides of the worm 145 on anti-friction bearings 147, 147 and has a spur gear 149 on its outer end. The spur gear 149 meshes with a spur gear 150 on the inner end of the shaft 109, for driving said shaft and the associated tread device 11. The two continuous tread devices 11, 11 may thus be driven either independently or simultaneously in forward or reverse direction, to propel the machine and to manipulate the machine into position to sump the cutter bar 12 in the coal seam along the mine bottom.

While the machine is usually sumped into the working place by the flexible draft devices 50, 50 secured to suitable jacks at their ends, sufficient power is provided and the sumping speed is slow enough to effect sumping of the cutter bar 12 by means of the traction tread devices without the aid of the flexible draft devices when desired.

The means for elevating the cutter bar 12 and the bottom of the frame 14 above the mine bottom about the axis of the drive sprockets 107, 107 is herein shown as comprising two vertically extending fluid pressure cylinders 155, 155. The fluid pressure cylinders 155, 155 are each shown as having inwardly extending brackets 156, 156 secured to the outer sides of the side walls 73, 73 of the support frame 14 adjacent the upper end thereof. Pistons 157, 157 extensible from the bottom of the cylinders 155, 155 are shown as having rounded lower engaging end portions slidably engageable with the top surfaces of abutment shelves 159, 159. The shelves 159, 159 are shown as being secured to the side frame members 120, 120 of the crawler frames 43, 43 adjacent the upper ends thereof and as extending inwardly therefrom. Upon the admission of fluid under pressure to the head ends of the cylinder 155, 155, the entire machine is elevated about the axis of the drive sprockets 107, 107 into the tramming position shown in Figure 2. The machine is then in position to be trammed from working place to working place, it being understood that during cutting the shoes 47, 47 and the rear end portion of the support frame 14 rest on the mine bottom and slide laterally therealong, as do the bottom runs of the tread devices 11, 11.

A tilting shoe 160 extends across the rear end portion of the machine, beneath the casing for the motor 18 and ahead of the drive sprockets 107, 107 for the tread devices 11, 11. The tilting shoe 160 is herein shown as extending transversely across the bottom of the machine and as being abutted adjacent its opposite ends by pistons 161, 161. The pistons 161, 161 are shown as extending downwardly from and as being movable within vertically extending cylinders 162, 162 depending from the bottom of the motor casing 13. As herein shown, the cylinders 162, 162 are mounted within annular bosses 163, 163 depending from and formed integrally with the bottom of the motor casing 13. Each piston 161 is shown as having lugs 164, 164 extending forwardly and rearwardly therefrom and forming a means for connecting said piston to the tilting shoe 160. Pivot pins 165, 165 are shown as being provided to loosely pivotally connect said lugs to spaced upright lugs 166, 166 extending upwardly from opposite sides of the shoe 160. The fit between the pins 165, 165 and the lugs 164, 164 and 166, 166 is sufficiently loose to accommodate either piston 161 to laterally tilt the machine about the other piston upon the application of fluid under pressure to one piston only. The pistons 161, 161 are retracted within the cylinders 162, 162 by means of compression springs 167, 167. Each spring 167 encircles a headed stud 168 secured to and depending from the bottom of the motor casing 13 coaxially with the center of the annular boss 163. The spring 167 is shown as engaging a closure 169 for the piston 161 at its upper end. The closure 169 may be threaded within the upper open end of the piston 161 and is slidable along the stud 168.

Upon the admission of fluid under pressure to the head ends of the cylinders 162, 162 the rear end of the machine will be tilted about the forward end portions of the shoes 47, 47 in an obvious manner, to position the cutter bar in the correct cutting position with respect to the coal face and to prevent climbing thereof or digging thereof into the bottom. The springs 167, 167 serve to return the shoe to the position shown in Figures 2 and 10 upon the release of fluid under pressure from said cylinders. It should here be noted that when the shoe 160 is in the retracted position shown in Figures 2 and 10 that the bottom of said shoe is a substantial distance above the mine bottom to provide clearance for the machine during transportation thereof. It should further be understood that the shoe 160 may be positioned to support the rear end portion of the machine for lateral slidable movement along the ground during the cutting operation where necessary or desired.

It will be understood that various modifications and variations of the present invention may be effected without departing from the spirit and scope of the novel concepts thereof.

I claim as my invention:

1. In a room and pillar kerf cutting machine, a motor, a main frame extending forwardly therefrom, a cutter bar projecting forwardly from said main frame and having a cutter chain guided for orbital movement thereabout, a sprocket journaled on said main frame for rotation about a vertical axis and driving said cutter chain, a spiral conveyor disposed rearwardly of said sprocket and extending transversely of said main frame for discharging the cuttings to one side thereof, an opening in said conveyor facing said sprocket and having cuttings communication with said cutter chain, means supporting the rear end of the machine for slidable movement along the ground and for transporting the same comprising two laterally spaced continuous traction tread devices, one extending along each side of said motor and main frame, tread frames for said continuous tread devices for guiding the same in closed orbital paths, drive sprockets for said continuous tread devices journaled in said tread frames, supporting connections between said tread frames and said motor coaxial with the axis of said drive sprockets, a cuttings discharge passageway extending through the tread frame on the retreating side of the machine, and cylinder and piston means on said main frame and engaging said tread frames and elevating said cutter bar for transportation and also lowering said main frame into engagement with the ground and positioning said spiral conveyor to register with said discharge passageway when said main frame is in engagement with the ground.

2. In a mining machine of the class described, a main frame, a motor secured thereto and projecting rearwardly therefrom, said main frame having a ground engaging surface slidably movable along the mine bottom, a cutter chain guided for orbital movement therealong, a sprocket journaled in said main frame for driving said cutter chain about said cutter bar, cuttings conveying means extending transversely of said main frame rearwardly of said sprocket and in the path of the cuttings discharged by said cutter chain for conveying the cuttings from the path of said cutter chain comprising a transverse tube having a spiral conveyor extending therealong and having an opening in a wall thereof facing said cutter chain and in cuttings receiving relation with respect thereto, means supporting the rear end of the machine for slidable movement along the ground comprising two laterally spaced continuous tread devices, hydraulic cylinder and piston means adjacent the forward end of said main frame for elevating said cutter bar and main frame above the ground for transportation, and a discharge passageway defining member extending between the runs of the continuous tread device on the retreating side of the machine, and aligned with discharge opening of said tube and spiral conveyor when said main frame is in a lowermost position in engagement with the ground, for directing the cuttings beyond the retreating side of the machine.

3. In a kerf cutting machine of the class described, a main frame, a motor secured to and projecting rearwardly from said main frame, a cutter bar projecting forwardly from said main frame, a cutter bit carrying cutter chain guided for orbital movement about said cutter bar, a drive sprocket journaled in said main frame rearwardly of said cutter bar and meshing with said cutter chain, for driving the same, said main frame having ground engaging shoes extending along and spaced laterally from said cutter bar and also extending along and spaced to the rear of said cutter bar and chain and the inner margins of said shoes defining an open bottom portion within the limits of said cutter chain, the space between said shoes and cutter bar and cutter chain on the advance side of the machine forming a cuttings channel, means supporting said motor above the ground and for slidable movement along the ground during cutting and for supporting said main frame and cutter bar in an elevated position for transportation comprising two laterally spaced continuous tread devices having supporting surfaces on the same level as the ground engaging shoes of said main frame, tread frames for said tread devices, transverse pivotal supporting connections between said tread frames and said motor for supporting the same above the ground, a transversely extending spiral cuttings discharge conveyor carried by said main frame rearwardly of said cutter chain sprocket in the path of the cuttings carried along said channel by said chain and having a discharge end positioned to discharge the cuttings through and between the treads of the tread device on the retreating side of the machine.

4. In a room and pillar kerf cutting machine, a motor, a main frame projecting forwardly from said motor, a cutter bar projecting forwardly from said main frame, a sprocket journaled in said main frame for rotation about a vertical axis, a cutter chain meshing with said sprocket and orbitally driven about said cutter bar thereby, said frame having spaced ground-engaging shoes extending along and spaced laterally from said cutter chain and having an open bottom between said shoes, the space between said chain and the insides of said ground-engaging shoes forming a cuttings channel, means supporting said motor above the ground for cutting and transportation comprising two laterally spaced continuous traction tread devices, tread frames therefor, means pivotally supporting said motor on said tread frames for movement about a transverse axis spaced beneath the bottom of said motor, means elevating said main frame and cutter bar about the axis of pivotal movement of said motor with respect to said tread frames, and cuttings conveying means extending transversely of said main frame and including a transverse conveyor tube disposed rearwardly of said cutter chain and having a cuttings receiving opening in communication with said channel, a conveyor spiral extending along said tube and terminating adjacent the retreating side of said main frame, and a passageway defining member opening to the retreating side of the machine and mounted in and extending transversely of the tread frame on the retreating side of the machine, in position to register with the discharge end of said conveyor tube and spiral when said main frame is in a cutting position in engagement with the ground.

5. In a kerf cutting machine of a type slidably movable along a mine bottom during cutting, a motor, a main frame extending forwardly of said motor, a cutter bar projecting forwardly of said main frame, a sprocket journaled in said main frame for rotation about a vertical axis, a cutter chain meshing with said sprocket and orbitally driven thereby about said cutter bar, said main frame having wall portions extending along opposite sides of said cutter bar and chain in spaced relation with respect thereto and having ground-engaging shoes extending outwardly from said wall portions, a transverse conveyor tube disposed rearwardly of said sprocket and having a cuttings-receiving opening in communication with the path of travel of said cutter chain and the side wall on the advance side of the machine, a conveyor spiral extending along said tube, a laterally spaced continuous traction tread device extending along each side of said motor and main frame, tread frames for said continuous tread devices, means pivotally supporting said motor on said tread frames, a passageway defining member extending through the tread frame on the retreating side of the machine, hydraulic cylinder and piston means interposed between said main frame and tread frames for elevating said cutter bar and main frame about the axis of connection of said motor to said tread frames and for accommodating said main frame to move downwardly into engagement with the ground and said conveyor tube to register with said passageway defining member.

6. In a kerf cutting machine of the type adapted to cut by slidable movement along a mine bottom, a motor, a main frame secured to and extending forwardly of said motor, a cutter bar projecting forwardly of said main frame, a sprocket journaled in said main frame for rotation about a vertical axis, a cutter chain meshing with said sprocket and guided for movement about said cutter bar, said main frame having wall portions extending along opposite sides of said cutter bar and chain in spaced relation with respect thereto and with said cutter bar defining incoming and outgoing cutter chain channels and also having ground-engaging shoes extending outwardly therefrom, and being open to the ground in the space between said wall portions, a conveyor tube extending transversely of said frame and opening to the retreating side thereof and having a cuttings receiving opening in communication with the incoming cutter chain channel, a spiral conveyor element extending along said tube, means supporting the rear end portion of said motor comprising two laterally spaced continuous traction tread devices, tread frames for said tread devices, means pivotally supporting said motor on said tread frames for movement about a transverse axis spaced beneath the bottom of said motor, and supporting the machine for pivotal movement about said pivotal axis, fluid pressure cylinder and piston means interposed between the forward end of said main frame and said tread frames and selectively operable to elevate said main frame and cutter bar about the axis of pivotal connection of said motor to said traction devices, and a passage-defining member extending through the tread frame on the retreating side of the machine in position to register with the discharge end of said conveyor tube when said main frame is in a cutting position in engagement with the ground.

7. A kerf cutting machine of the class described comprising a motor, a main frame secured to and extending forwardly of said motor, a cutter bar projecting forwardly of said main frame, a sprocket journaled in said main frame for rotation about a vertical axis, a cutter chain meshing with said sprocket and guided along said cutter bar for movement thereabout, said main frame having side wall portions extending along opposite sides of said cutter bar and chain and a rear wall portion extending around the rear end of said sprocket and conforming to the path of travel of said cutter chain and also having ground-engaging shoes extending outwardly from said wall portions, and being open to the ground in the space beneath said cutter chain and sprocket, a transverse conveyor tube extending along the ground forwardly of said motor and intersecting said rear wall portion and opening to the retreating side of said frame, and having a cuttings receiving opening in communication with the passage defined by said rear wall and said side wall on the advance side of the machine, and a spiral conveyor element extending along said tube for discharging the cuttings to the retreating side of the machine.

8. A kerf cutting machine of the class described comprising a main frame having a ground engaging surface supporting the forward end of the machine for movement along the ground, a motor extending rearwardly of said main frame, a cutter chain carrying cutter bar projecting forwardly of said main frame, a feed drum on said main frame selectively driven by said motor and a flexible draft device adapted to be wound thereon for laterally feeding the machine along the mine bottom, means supporting the machine for transportation including two tread frames, one extending along each side of said machine and pivotally mounted thereon for movement about a transverse axis disposed adjacent the rear end thereof, a continuous traction tread device movable about each of said tread frames, a drive sprocket for each tread device coaxial with the axis of pivotal mounting of the machine on said tread frames, means driven by said motor for driving said drive sprocket and tread devices, and said tread devices providing ground engaging surfaces at the same level as the ground engaging surface of said main frame during cutting, to support the rear end of the machine for transverse slidable movement along the mine bottom by operation of said feed drum and draft device.

9. A kerf cutting machine of the class described comprising a main frame having a ground engaging surface supporting the forward end of the machine for slidable movement along the ground, a motor secured to and extending rearwardly of said main frame, a cutter chain carrying cutter bar projecting forwardly of said main frame, a feed drum on said main frame selectively driven by said motor and a flexible draft device wound thereon for feeding the machine laterally along the ground, means supporting the machine for transportation including two tread frames, one extending along each side of the machine and pivotally mounted thereon for movement about a transverse axis disposed adjacent the rear end thereof, a continuous tread device movable about each tread frame, a drive sprocket journaled coaxial with the axis of pivotal mounting of the machine on said tread frames, means driven by said motor for driving said sprockets and continuous tread devices, hydraulic cylinder and piston means interposed between opposite sides of said main frame and said tread frames adjacent the forward ends thereof, for elevating the machine above the ground about the axis of said drive sprocket for transportation, and said continuous tread devices providing ground engaging surfaces at the same level as the ground engaging surface of said main frame when said main frame is lowered into engagement with the ground to support the machine for transverse slidable feeding movement along the ground for cutting, effected by operation of said feed drum and draft device.

References Cited in the file of this patent
UNITED STATES PATENTS

| | | |
|---|---|---|
| 1,377,603 | Schneider | May 10, 1921 |
| 1,644,227 | Benedict | Oct. 4, 1927 |
| 1,664,666 | Davis | Apr. 3, 1928 |
| 1,794,367 | Davis | Mar. 3, 1931 |
| 2,206,598 | Dartnell | July 2, 1940 |
| 2,320,004 | McCullough | May 25, 1943 |
| 2,495,057 | Dillingham | Jan. 17, 1950 |
| 2,564,038 | Stephenson | Aug. 14, 1951 |